Patented Apr. 5, 1938

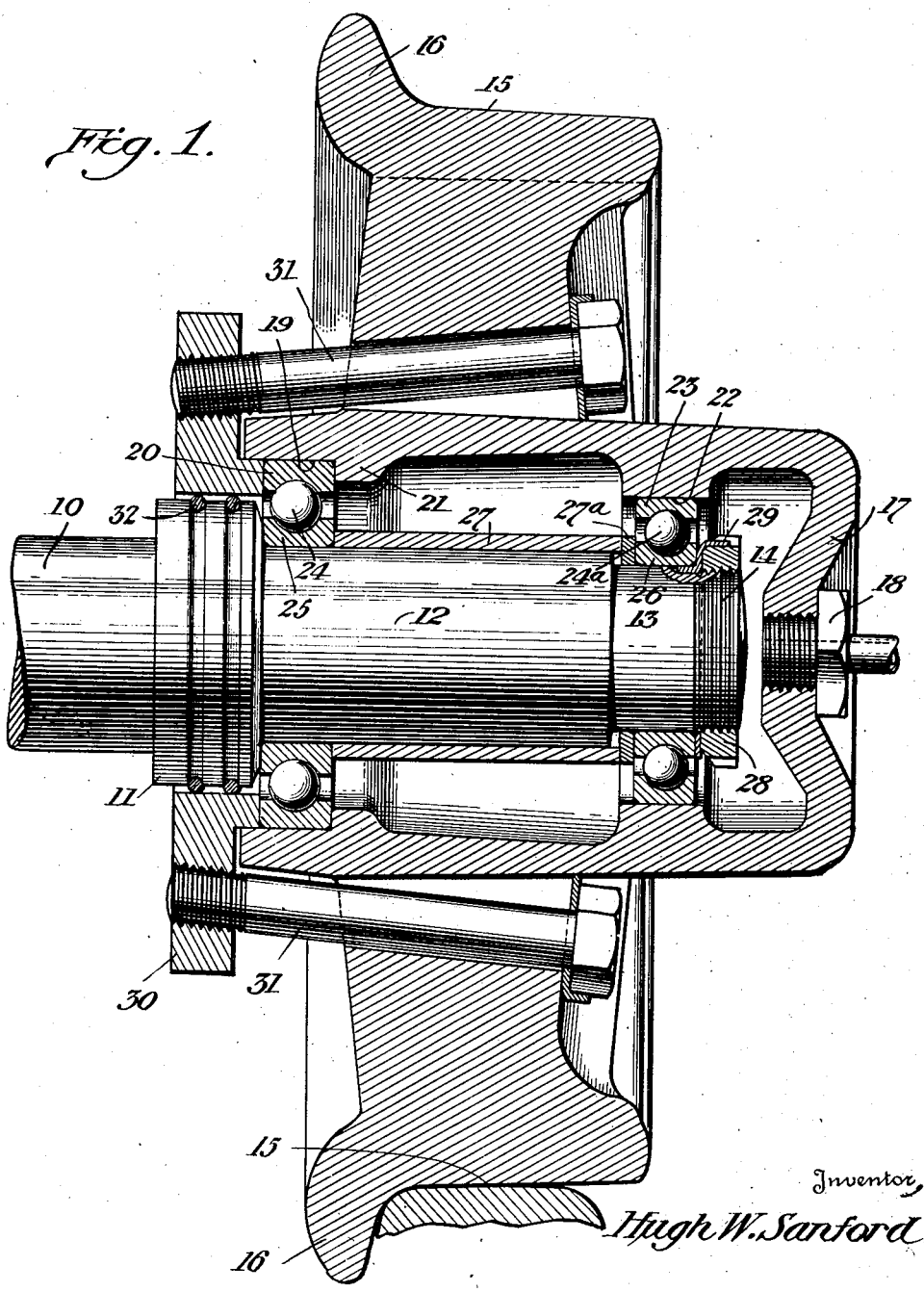

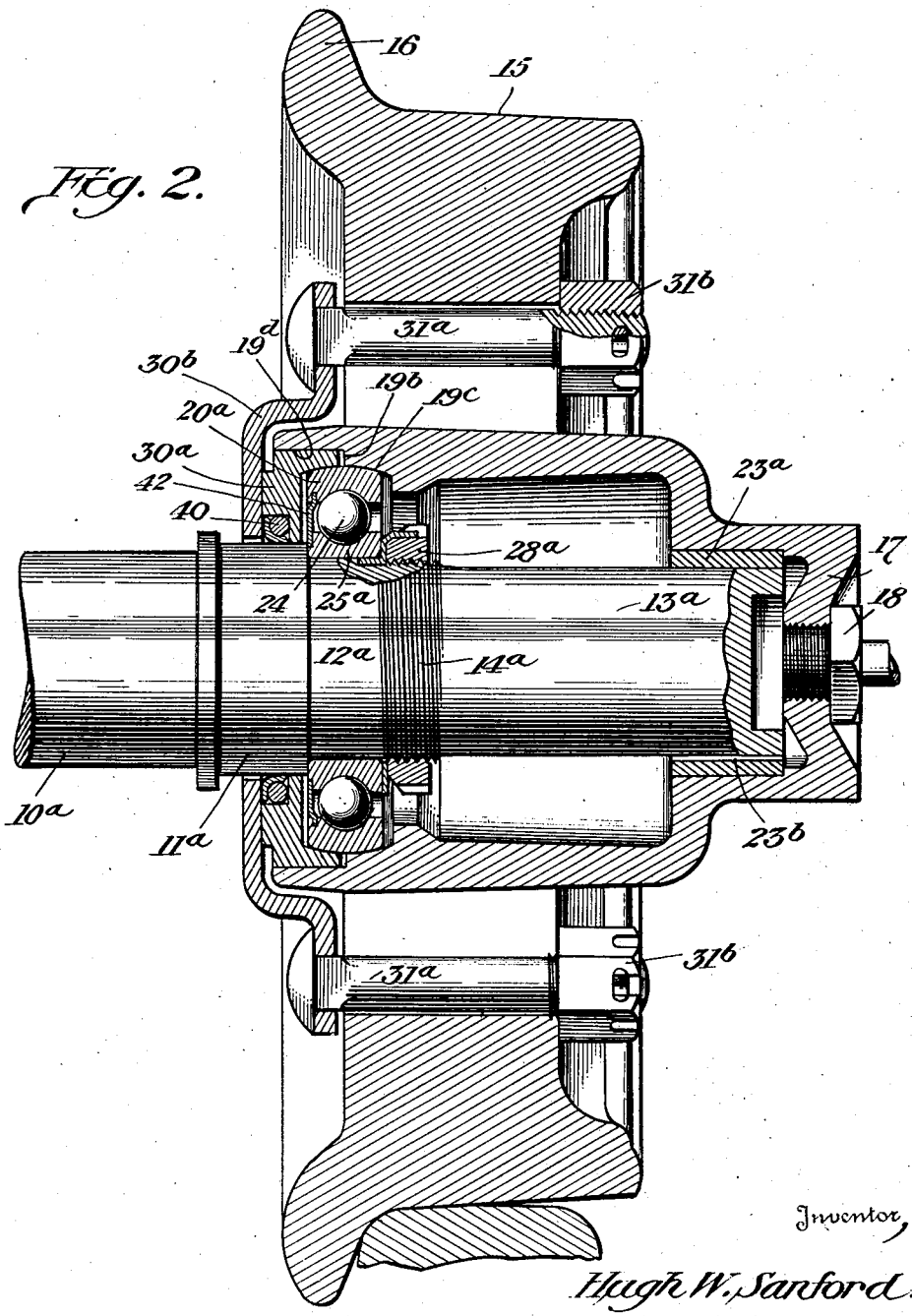

2,113,497

UNITED STATES PATENT OFFICE 2,113,497

ANTIFRICTION BEARING ASSEMBLY FOR WHEELS AND AXLES

Hugh W. Sanford, Knoxville, Tenn.

Application January 20, 1933, Serial No. 652,737

12 Claims. (Cl. 295—44)

This invention relates to improvements in anti-friction bearing assemblies for wheels and axles, and more particularly concerns simply and cheaply constructed strong assemblies of this type.

One of the features of the present invention is the provision of a separable wheel having a hub chamber to receive spaced bearing members which are normally secured to the axle, and in which the clamping of one bearing member to the wheel hub is employed as a means of holding the separable wheel upon the axle.

Another feature of the present invention is the provision of a wheel and axle assembly in which a large anti-friction bearing is employed close to the plane of the track gage line, and is connected to both the axle and the wheel for resisting axial and radial stresses, in conjunction with a smaller bearing located adjacent the end of the axle as a self-adjusting pilot for assuring the operation of the larger main bearing.

A further feature of the present invention is the provision of a wheel and axle assembly in which a large anti-friction main bearing is employed at the inner end of the hub, and is secured against movement relative to the hub and axle, in conjunction with a small outer or auxiliary bearing which operates as a pilot for controlling the operation of the main bearing.

Still another feature of the present invention is the provision of a wheel and axle assembly employing a large anti-friction main bearing adjacent the inner end of the hub for opposing all axial thrusts and for receiving the major portion of radial thrusts resulting from the lading, in conjunction with a smaller plain bearing located at the outer end of the axle to operate as a pilot for the main bearing.

These and other objects of the present invention will appear in the course of the following description and claims, and in connection with the illustrative example set forth in the accompanying drawings, in which:

Figure 1 is a diametrical sectional view through one form of construction, with the employment of anti-friction main and pilot bearings.

Figure 2 is a corresponding view of a second form in which an anti-friction main bearing and a plain pilot bearing are employed.

In these drawings, the axle 10 has a collar 11, and a smooth cylindrical portion 12, a reduced cylindrical portion 13 and a screw thread 14. The wheel has its body formed with a tread surface 15 and a flange 16 in the usual way, and includes a hollow hub having an outer closing wall 17 apertured and threaded to receive a lubricating device 18. An inner bore surface 19 is provided at the inner end of the hub to receive the hub race 20 of a main anti-friction bearing, this race fitting against a shoulder of an internal flange 21 of the hub. Spaced from the inner bore surface 19, and located adjacent the end of the axle, is an outer bore surface 22 fitting the hub race 23 of the auxiliary or pilot anti-friction bearing.

These bearings, in Figure 1, are illustrated as both being of ball type and have respectively the balls 24, 24a which fit in grooves of the aforesaid hub race 20, 23, and also in grooves of corresponding axle races 25, 26. This is a well known arrangement of ball bearings which enables them to resist both axial and radial thrusts. The axle race 25 of the inner or main bearing fits against the axle collar 11. The two axle races are held at predetermined distances by spacer members 27, 27a. A nut 28 engaged with the threaded portion 14 of the axle serves to force the axle races and spacer members together and into rigid relationship with the axle collar 11. A lock washer 29 is shown for preventing displacement of the nut 28 from adjusted position.

The hub race 20 is held against the flange 21 by a pressure plate 30 which is clamped in position by cap screws 31 which extend through appropriate apertures in the wheel.

An appropriate form of oil seal 32 is provided, in the form of Figure 1, which includes packing rings located in grooves formed on the collar 11. The hub is hollow and preferably has its greater diameter closely adjacent the auxiliary or pilot bearing, so that lubricant within the hub is carried toward the outer end of the hub when the wheel is at a standstill.

It will be noted that the parts may be easily and cheaply made, the hub for example being formed as a casting and subjected to a boring operation for finishing the outer bore surface 22, the inner bore surface 19, and the shoulder of the flange 21: these are the only internal hub surfaces which need finishing treatment. The pieces assembled upon the axle are likewise of simple form and readily manufacturable.

In manufacture, the pressure plate 30 is slipped over the axle collar 11 and left loose; the anti-friction main bearing assembly is slid onto the axle, spacing members 27, 27a are slipped on, then the assembled auxiliary bearing, and finally these parts are clamped tight by the nut 28. The wheel is now slid over the bearing assembly. As the internal diameter of flange 21 is greater than the internal diameter of the outer bore surface 22, there is no difficulty in accomplishing this, and the shoulder of the flange 21 ultimately comes to bear against the hub race 20. The axle race 26 of the pilot bearing need not occupy any exact position, and hence the spacer members 27, 27a need not be made with scrupulous accuracy, nor need the axial dimensions of the axle and hub be scrupulously observed. The boring operation, however, affords a close fit of the hub races against their corresponding bore surfaces 19 and 22: and the outer hub race 23 adapts itself to its bore surface 22 according to the axial dimensions of the other parts.

The pressure plate 30 is now brought over the collar 11, after insertion of packings, and the cap screws 31 are employed to draw the pressure plate tight and thus clamp the hub race 20 of the main bearing against the shoulder of flange 21.

Thus, the hub race of the main bearing is practically clamped to the hub against relative axial movement. Similarly, the axle race of this main bearing is clamped to the axle, against axial movement with respect thereto, through the agency of the collar 11, the spacer elements and the axle race of the pilot bearing, by the nut 28. The hub race 23 of the outer bearing floats with respect to its bore surface, that is, it is free for axial movement relative thereto, and alines itself during assembly at its operating axial position.

This structure lends itself excellently to quick replacement of parts, as it is only necessary, in replacing a broken or worn wheel, to release the cap screws 31, pull the wheel from the bearings, and substitute a new wheel. It is well known that anti-friction bearing races can be made to high standards of accuracy, and the single boring operation performed on the interior of the hub assures as high a degree of accuracy for these surfaces as may be desired. It will be noted that the surfaces of the hub and axle races may even be loose for slight axial and even rotative movements, without seriously affecting the operation of the structure.

In the modified form shown in Figure 2, again, a large main anti-friction bearing is employed in conjunction with a small outer auxiliary or pilot bearing, which in this modification is a plain bearing.

In this form, the wheel has the tread 15, flange 16 and a hollow hub as before. The hub has a bore surface 19a adjacent its inner end, terminating at shoulder 19b. Adjacent this shoulder is a spherical surface 19c. At the outer end, the hub is substantially closed by an end wall 17 having a lubricating plug 18 as before. The outer end of the hub likewise has a bore surface 22a in which is received a bearing bushing 23a fitting the end of the axle and having oil grooves 23b therein from point to point.

The axle 10a has a collar 11a, a smooth cylindrical portion 12a, a threaded portion 14a and a second and smaller cylindrical portion 13a which fits within the bushing 23a.

The anti-friction main bearing includes the outer race 20a having a spherical exterior fitting the surface 19c and also an internal surface of a pressure ring 30a, which is held clamped in position by a pressure plate 30b. The main bearing is shown as having the balls 24 and the axle race 26a fitting the cylindrical portion 12a of the axle. A clamping nut 28a on the threads 14a operates to clamp the axle race against the axle collar 11a.

A leather and spring packing 40 is provided in this form in a groove furnished by a rebate in the pressure ring 30a and by the pressure plate 30b.

The pressure plate 30b is held in position by carriage bolts 31a having castellated nuts 31b engaged with the outer face of the wheel.

Here again, the parts may be cheaply and easily made, without extreme regard for accuracy of dimensions. The hub may be formed by a boring operation as before, and the bushing 23a force-fitted in place.

The pressure plate 30b and pressure ring 30a are slid onto the collar 11a, with the packing 40 inserted. The anti-friction main bearing assembly is then slid onto the cylindrical portion 12a and clamped directly by the nut 28a.

The wheel may now be slid onto the bearings, and the bolts 31a inserted and tightened. The spherical shape afforded in this modification to the conforming surfaces of the hub race and axle and clamping ring structures permits a self-alignment of this main bearing. This occurs even in the event of considerable wear of the pilot bearing, either of its bushing 23a or of the axle end: without the imposition of skewing relative strains on the axle and hub races.

In this form of construction, the single main bearing assembly is shown as of a type including an oil sealing shield 42.

In each form of construction, the assembly includes a large main bearing located substantially in the plane of the track gage line. The races of this main bearing are held against axial movement relative to one another, by the construction of the bearing in the illustrated forms, and relative axial or end thrusts between the wheel and axle are assumed by this main bearing, and it also operates to assume the major portion of all relative thrusts. In each case, further, a smaller and cheaper bearing is provided adjacent the outer end of the axle and farther from this plane as an auxiliary or pilot bearing for assuring the proper positioning of the parts for the satisfactory operation of the main bearing. In each instance, accuracy of axial dimension is not of considerable importance, as large variations may occur without affecting the behavior of the structure.

With such constructions, it is not possible for an inexperienced workman to "pinch" ball bearings by clamping them in such a way that excessive end thrusts arise from the clamping. The play in the main bearing in each instance determines the relative axial movement of the wheel with respect to the axle, as the auxiliary bearing in each case is free for such relative or floating axial movement.

A particular feature in both of the illustrated forms is that the oil space provided for the chambered hub has a greater diameter adjacent the pilot bearing than adjacent the main bearing. The bottom of this oil cavity, when the wheel is at rest, therefore, has a downward and outward slope so that the oil tends to drain away from the inner face of the wheel,—at which point only can it escape from the hub. In this branch, it tends to carry with it the dirt and sediment and to deposit these near the outer end of the hub chamber. Thus a supply of oil is maintained in the bearing for a very long time, and becomes available during the rotation of the wheel, as it is carried up along the internal hub surfaces and tends to flow inward toward the main bearing.

It is obvious that the invention is not limited solely to these forms of construction, but that it may be employed in many ways without departing from the scope of the appended claims.

Having thus described the invention, what I claim as new and desire to secure by Letters Patent, is:—

1. In a device of the class described, a wheel having a hollow hub with an inner bore surface, an axle having a collar spaced from its end, an anti-friction main bearing constructed and arranged to resist relative axial movement of its hub and axle races, means for clamping the axle race of said main bearing against said collar whereby to prevent relative axial movements of said axle race and the axle, means on the wheel for clamping said hub race against axial movement relative to the hub but permitting a rocking movement with respect thereto, and means for providing an auxiliary bearing adjacent the end of the axle.

2. In a device of the class described, a wheel having a hub provided with an oil cavity having a tapered peripheral wall with a greater internal diameter adjacent the outer end of the hub than adjacent its inner end, means for closing the outer end of the hub, an axle extending through the oil cavity, means on the hub and axle for providing axially spaced bearings adjacent the inner and outer ends of the cavity, and oil sealing means at the inner end of the hub of lesser diameter than said inner bearing for limiting the flow of oil away from the inner of said bearings, said tapered wall operating while the wheel is at rest to drain the oil away from the oil sealing means and while the wheel is in motion to effect a flow of oil toward said inner bearing.

3. In a device of the class described, the combination of a flanged wheel having a hollow hub, an axle extending into the hub, a single ball bearing assembly including a grooved hub race member, a grooved axle race member and balls located in the grooves of said members and cooperative therewith for preventing relative axial displacements of said members, means for holding said hub race axially immovable relative to said hub and means for holding said axle race immovable relative to said axle so that said ball bearing assembly prevents relative axial movements of the wheel and axle, and means on said wheel and axle for providing a plain bearing spaced axially from said ball bearing assembly for maintaining the axes of the wheel and axle coincident, said plain bearing permitting relative axial movement between said wheel and axle.

4. In a device of the class described, the combination of a flanged wheel having a hollow hub, an axle extending into the hub, a single ball bearing assembly including a grooved hub race member, a grooved axle race member and balls located in the grooves of said members and cooperative therewith for preventing relative axial displacements of said members, means for holding said hub race axially immovable relative to said hub and means for holding said axle race immovable relative to said axle so that said ball bearing assembly prevents relative axial movements of the wheel and axle, means on said wheel and axle for providing a plain bearing spaced axially from said ball bearing assembly for maintaining the axes of the wheel and axle coincident, said plain bearing permitting relative axial movement between said wheel and axle whereby said ball bearing carries the major portion of the normal radical load on the wheel.

5. In a device of the class described, a wheel having a hollow hub with abutment means therein, an axle extending into said hub, an anti-friction bearing having hub and axle races, means for holding the axle race against axial movement relative to the axle, a clamping ring operative for holding the hub race against said abutment means and extending toward the axle free of contact with said axle race, packing means presented by said bearing along the axle, and means for holding said clamping ring in position, said clamping ring having a groove adjacent the axle and opening at its face away from the bearing, packing means in said groove, a clamping member engaging said ring for holding it in position and maintaining said packing means in position, and devices for holding the clamping member to said wheel.

6. In a device of the class described, a wheel having a hollow hub, an axle extending into said hub, a large anti-friction main bearing constructed and arranged to resist relative axial movements of its hub and axle races, said hub having an inwardly extending abutment engaged with said main hub race to limit relative axial movement of said wheel and bearing in one direction, means for holding the said main hub race against said abutment to limit relative axial movement in the other direction, means for holding the axle race of said main bearing against bodily axial movement relative to said axle, and means for providing a small auxiliary bearing adjacent the end of said axle in which the bearing structure on the axle is free for relative axial movement in the hub and including cylindrical plain bearing surfaces free for floating relative axial movement.

7. In a device of the class described, a wheel having a tread surface and a hollow hub, said hub having an inward projection beyond adjacent parts of the wheel and also having internal abutment means spaced from its inner end, an axle having a shoulder spaced from its end, the end of the axle extending into said hollow hub, inner and outer bearings between the internal surface of said hub and the surface of said axle, means on the axle for clamping an axle portion of the inner bearing against said shoulder, a clamping means for holding a hub portion of said inner bearing against said abutment means; said latter clamping means including a pressure plate overlapping said inward projection of the hub and having an aperture receiving said axle and also having peripheral portions, clamping bolts engaging said peripheral portions and passing through the wheel and operable from the outer face thereof, a pressure ring located between the pressure plate and said hub portion of the inner bearing, said pressure plate having a recessed portion, and lubricant sealing means carried by said pressure ring and engaged with the axle within the recessed portion of the pressure plate.

8. In a device of the class described, a wheel having a hollow hub with abutment means therein, an axle extending into said hub, an anti-friction bearing having hub and axle races, means for holding the axle race against axial movement in either direction relative to the axle, a clamping ring operative for holding the hub race against said abutment means and extending toward the axle free of contact with said axle race, a clamping member, packing means presented upon the axle between said ring and member, and means for holding said clamping member in position.

9. In a device of the class described, a wheel having a tread surface and a hollow hub, internal abutment means in said hub, an axle having shoulder means spaced from its end, the axle extending into the hollow hub, bearing means located between the hub and axle and including hub race means, axle race means and anti-friction elements therebetween, said hub race means bearing against said abutment means, clamping means on the axle engaged with said axle race means and cooperating with said shoulder to prevent relative axial displacement of the axle and axle race means and to hold the hub race means and anti-friction elements in assembled position upon the axle and engaging said hub race means, said clamping means including a ring having a rebate adjacent the axle, threaded devices accessible at the outer face of the wheel for drawing said clamping means and hub together for holding said hub race means against said abutment means and thereby operating to hold the wheel against axial movement relative to the axle, a pressure plate for pressing the ring against the hub race means and having means at its periphery for engagement by said threaded devices, and a packing located in the rebate for preventing leakage of lubricant from said hub.

10. In a device of the class described, a wheel having a hollow hub, an axle extending into said hub, an anti-friction main bearing constructed and arranged to resist relative axial movement of its hub and axle races, means for clamping the axle race of said main bearing against relative movement along the axle, means on the wheel for clamping said hub race against axial movement relative to the hub, one of said clamping means including parts permitting a relative rocking movement about an axis angularly directed with respect to the axle axis, and means for providing an auxiliary bearing spaced from said main bearing.

11. In a device of the class described, a wheel having a hollow hub with abutment means therein, an axle extending into said hub and including a cylindrical surface, an anti-friction bearing having hub and axle races, means for holding the axle race against axial movement in either direction relative to the axle, a clamping member operative for holding the hub race against said abutment means and extending toward the axle free of contact with said axle race, a clamping member securing member, and packing means rotatable with both members and frictionally engaging said cylindrical surface alone.

12. In a device of the class described, a wheel having a hollow hub with abutment means therein, an axle extending into said hub and including a cylindrical surface, an anti-friction bearing having hub and axle races, means for holding the axle race against axial movement in either direction relative to the axle, a clamping member operative for holding the hub race against said abutment means and extending toward the axle free of contact with said axle race, a clamping member securing member, and packing means carried by one said member and rotatable with both said members and having lubricant sealing frictional contact with said cylindrical surface alone.

HUGH W. SANFORD.